106. COMPOSITIONS, COATING OR PLASTIC.

Patented Oct. 2, 1934

1,975,078

UNITED STATES PATENT OFFICE 1,975,078

MICA PRODUCTS WITH INORGANIC BINDERS

Willis A. Boughton, Cambridge, Mass., assignor to New England Mica Co., Waltham, Mass., a corporation of Massachusetts No Drawing. Application March 9, 1931, Serial No. 521,378

9 Claims. (Cl. 154—2.6)

This invention relates to built-up flexible inorganic bound mica products, made from plates, or flakes, or films of mica, cemented together by an inorganic binder, and which may be suitably shaped into plates, tubes, or other special products during the process of manufacture.

An object of the invention is to provide a flexible high-resistance fire-proof and non-combustible mica product, which may be manufactured in any desired shape, and of any desired thickness.

A further object is to provide mica products which increase in resistance with age, and which possess still higher resistance after having been heated to higher than the temperatures to which said products are normally submitted.

A further object is to provide flexible mica products which are free from organic materials, and that will not carbonize or disintegrate after prolonged excessive heating.

A further object is to provide flexible mica products which are not affected by organic solvents such as oils, etc., and which may be used in circulating oil cooled apparatus, or with other apparatus upon which oil may be brought into contact without injury.

A further object is to prepare flexible mica products which will have a definite temperature range of flexibility, the degree of which may be pre-determined, and in which there is not any slippage or buckling of the mica flakes.

A further object is to provide an inorganic bound mica product which is flexible and possesses a high dielectric strength at one temperature, and is less flexible or is inflexible and possessing a higher dielectric strength at a higher temperature.

Other objects of the invention will be apparent to those skilled in the art after reading the specification.

The flexible mica products of commerce heretofore available have been bound with a resin usually containing a flexibilizing medium such as castor oil. Such an organic-bound product has obvious disadvantages; for example, it is disintegrated rapidly in the presence of oils or organic solvents; and when over-heated it chars and may actually burn, constituting a genuine fire risk.

After considerable research with mica products made with many types of binders, I have discovered that a highly limited group of inorganic substances, all of similar physical properties for the present purposes, may be used as inorganic binders in the production of a new kind of flexible mica product, which binders, because of their wholly inorganic nature, do not burn or char, and are highly resistant to the action of oils and organic solvents.

This group of substances includes those anomalous inorganic compounds which are capable of forming highly viscous aqueous solutions in the presence of a moderate amount of water, holding a part or all of this water in colloidal combination or otherwise considerably more firmly than is ordinarily the case with water of solution. Thus when such viscous aqueous solutions are heated, they as a rule evolve this water slowly above 100° C., forming fluids of increasingly greater viscosity; and if the heating is continued a part of the dissolved substance may finally precipitate or the product may become substantially anhydrous, forming a glass. Indeed, all of the substances known to me to be in this classification, when strongly heated, even though then solid, melt to form viscous liquids which after cooling have markedly glass-like properties, or are true glasses.

The property of forming glasses on fusion and subsequent cooling however, is not confined to this limited group of inorganic substances, and is not cited as an exclusive property of them. On the other hand, the property of yielding up water of solution slowly and at super-normal temperatures, (in this case above 102° C. to 105° C.) is given as the fundamentally important characteristic of the group of substances herein cited, and is to the best of my knowledge limited to them. Examples of such substances are:—

(1) Sodium metaphosphate, $NaPO_3$, a true single substance glass when prepared by fusing and cooling primary sodium phosphate;

(2) Ammonium metaphosphate;

(3) Metaphosphoric acid (the ordinary glacial phosphoric acid of commerce);

(4) Sodium metaborate now better known as sodium monoborate;

(5) Ordinary sodium silicate, or water-glass.

In the case of sodium silicate however, temperatures above about 80° C. should be considered as super-normal, because of the high viscosity of solutions of this substance which are stable at this temperature. Heating to 100° C. produces in the water-glasses an intumescence, due to the failure of steam bubbles which are formed to escape from the highly viscous liquid, and so by expansion destroys the unusual binding properties which sodium silicate is known to have. Nevertheless, even when a mass of intumesced sodium silicate which is stable at, say, 105° C. is subjected to high pressure it coalesces and forms a glass-like material that is adhesive to mica and will bond mica pieces into a more or less flexible sheet at such temperatures. Sodium silicate may, therefore, also be considered a typical example.

While reference has been made herein to the substances, sodium metaphosphate, ammonium metaphosphate, metaphosphoric acid, sodium metaborate, and sodium silicate, it will be apparent that other chemical substances having like properties could be used which are capable of forming viscous liquids, when associated with limited amounts of water, and holding that water at super-normal temperatures more tenaciously than ordinary water of solution is held, evolving it only slowly at higher temperatures, without great precipitation of crystalline solids if any, and without the loss of the property of high viscosity; a few border line compounds develop some dispersed fine crystal grains, but such mixtures also function well as binders for mica flakes. Also, a variety of salts of the element beryllium may be prepared in the adhesive gummy state, and function as binders for flexible mica products. For example, an aqueous solution of sodium beryllium sulfate forms by evaporation a thick viscous syrup; and the basic sulfates of beryllium form gummy masses. Similarly, certain salts of the element vanadium also form viscous solutions of the same general physical properties; examples of these are the double salts with the phosphates. Many other specific examples will be known to those familiar with the physical properties of such compounds.

The binder

For binding mica pieces together to form a commerically useful inorganic bound flexible sheet, I use an aqueous solution of, or combination with, sodium metaphosphate or other members of the limited class of inorganic substances having the characteristic properties described above.

Sodium metaphosphate (1) itself is easily prepared in water soluble form by fusion of the primary sodium orthophosphate, or sodium ammonium orthophosphate of commerce. The compound used is the glass-like hexametaphosphate, the so-called "Graham's salt", and with 40% of water boils at approximately 105° C. to 106° C. The approximately anhydrous melt is allowed to cool and forms a colorless, transparent, very hard glass. It is crushed and powdered to pass a 100 mesh screen, and equal parts of this material and either cold or warm water are rapidly and thoroughly mixed. The mixture, at first mud-like, quickly becomes highly viscous with evolution of considerable heat, and is then ready to be applied to the mica pieces (sometimes called mica films, splittings, fragments, flakes, etc.).

Ammonium metaphosphate (2) is prepared from primary ammonium orthophosphate, but in this case the decomposition of the latter salt takes place at lower temperatures, and it is sufficient to heat the primary orthophosphate until it melts and the liquid boils. Boiling is continued until the temperature reaches the vicinity of 300° C. when the liquid is allowed to cool. At ordinary temperatures it then resembles asphalt in viscosity and is a clear colorless and glass-like product, and may be used as a binder for mica flakes by warming until sufficient fluidity is obtained to permit application of the liquid by a brush or spray; or it may be mixed with enough water to give a solution that can be applied at ordinary temperature, in which case dehydration of the finished sheet is effected on a heated table, or in some other convenient way.

Metaphosphoric acid (3), that is, glacial phosphoric acid, is suitably dissolved in an excess of water and the excess removed by boiling, or it may be crushed and powdered to pass a 100 mesh screen, and thereafter treated as described above under sodium metaphosphate.

Sodium metaborate (4), is an article of commerce, and is a solid; a viscous solution of it is prepared in the usual way by dissolving in water and boiling until enough water has been driven off to leave an association of water and inorganic salt having a desired degree of viscosity. The solution thus obtained is used to bind the mica flakes as described above. Sodium metaborate solution containing about 50% of water boils at approximately 106° C. to 107° C.

Sodium silicate (5), is the ordinary water-glass of commerce. The solution is applied to the mica flakes as above described, and upon careful drying and rolling on a hot table produces a flexible mica plate; this is a new and novel use for water-glass in the binding of mica flakes, in that a new product, a flexible mica sheet, is obtained; heretofore, all water-glass-bound mica products have been by intent and design hard and rigid.

One of the important commercial advantages resulting from the use of this class of inorganic binders for flexible mica products is that by varying the amount of water associated with and retained in the inorganic compound binder the temperature range may be varied over which the mica product thus produced has a desired degree of flexibility. Thus, for use at normal temperatures and with sodium metaphosphate, a mixture of equal parts of the compound and water is used as the binder, producing with moderate further dehydration a product of good flexibility and without slippage of the mica pieces over one another under pressure, and without buckling, such a binder then containing 30%-40% of water. However, by lowering the amount of water to 25% to 30% or less of the total, a product may be prepared which is too stiff for use at ordinary temperatures, but is of useful flexibility at a temperature range in the vicinity of 50° C. Similarly, if as much as 40%-45% of water be used in association with the sodium metaphosphate a mica product is obtained that is too flexible for use at ordinary temperatures and shows slippage, but without dehydration is of useful flexibility and without slippage at, say, zero degrees C. In these properties, therefore, the inorganic-bound flexible mica product herein described resembles the common organic-bound flexible mica product of commerce. However, when dehydration is carried further by heating a hard non-flexible plate of enhanced dielectric strength is obtained, the binder then containing 20%-25% or less of water.

In the preparation of inorganic flexible mica products with the inorganic binders herein described, therefore, advantage is taken of the peculiar and anomalous property of sodium metaphosphate and some of the other substances herein described, whereby a viscous more-or-less gummy-like adhesive fluid is formed by the association of the solid with a limited amount of water, the amount being definite for each range of viscosity to practically a solid at ordinary temperatures. This association may be brought about by (1) mixing of solid with water, or (2) by solution in an excess of water with subsequent evaporation of the excess, or (3) in any other convenient and practicable manner such as by boiling a dilute solution until only the desired amount of water is left, as indicated by the boiling temperature.

The process

In making flexible mica products with this kind of inorganic binder, the mica pieces are laid as usual on a wire frame or other suitable supporting surface, the binder applied by brushing, spattering, spraying, or in any other convenient way, another layer of mica pieces added and more binder applied, and this process repeated until a sheet of somewhat greater than the desired final thickness is produced, ending with a covering of mica pieces. The sheet or other products, now a firmly adhering unit, is transferred to a hot table and rolled, or, with irregularly shaped products pressed, until any air bubbles are removed and the desired thickness obtained. It is then set aside to cool and is thereafter ready for storage or shipment. The process of manufacture does not require oven-baking, solvent recovery, nor press heating; it is sanitary and rapid, and there is no fire risk.

The product and its properties

The flexible sheet or product thus prepared shows the commercially useful flexibility over the temperature range for which it is intended to be used. It is transparent and colorless, or approximately so unless artificially colored, (as by the addition of a water-soluble dye or a colored salt such as a chromate, or the treatment of the binder compound with a color-producing inorganic substance such, for example, as a cobalt salt, by which means products bearing designs, or variegated or mottled appearing products may be made, or suitable trade-mark characters may be developed within the product). It shows no slippage and no buckling. It is non-combustible and non-inflammable, and does not support combustion. It is unaffected by oils, waxes, and almost all common organic solvents. Thin sheets may be formed into tubes of any desired thickness of wall by rolling and cementing with additional binder, and these may then, if desired, be hardened to rigidity by simple dehydration.

When the product is subjected to gentle heat, it gradually loses water, becoming progressively stiffer until a point of equilibrium is reached between the contained water and the temperature. With increasing temperature the product becomes less flexible, but it acquires an increased dielectric strength, and is mechanically stronger.

In the case of a plate bound with certain compounds of this type, such as sodium metaphosphate, the binder eventually may crystallize somewhat, but the plate does not even then fall apart unless subjected to tearing and distortion. Tubes made of such a plate retain their tubular form even when highly opacified by drying out. In this opaque dried out condition, however, the product is even a better electrical resister than when first prepared, the dielectric strength then running upwards of 300 volts per mil puncture resistance. When subjected to still higher temperatures (300° C.–500° C.) the dried-out opaque binder again melts and under pressure forms a highly adhesive mica binder of still greater enhanced electrical resistance. In this respect such a plate shows a vast improvement over the organic bound plates heretofore available, which, as is well-known, show diminishing electrical resistance as the temperature rises.

Plates bound with other materials such as ammonium metaphosphate, on the other hand do not ordinarily opacify and crystallize, but the binder retains its viscous glassy condition to the temperature of decomposition.

With sodium metaborate used as binder material, a product of somewhat greater dielectric strength is produced, having initially about 400 volts per mil, and after being dried out under the action of heat, about 900 volts per mil. The product in other respects is quite similar to though not identical with, a product bound with sodium metaphosphate binder.

With water glass as a binder material, a different class of products is obtained. A mica product bound with this material may be used only below about 80° C., for above this temperature the water-glass (sodium silicate) solution, as is well-known, becomes so viscous that its associated water has difficulty in escaping, tough-walled bubbles are formed and the phenomenon known as intumescence takes place, resulting in separation of the mica pieces and loss of integration. Nevertheless, when the water-glass-bound flexible mica product is heated under high pressure, integration is maintained, and the escaping water forces its way out without the destruction of the product. The electrical resistance of the water-glass-bound product is low compared with that of the other binders described herein, and its usefulness is therefore limited to those purposes which do not require the customary high dielectric strength. However, the use of water-glass solution as a binder for producing flexible mica products, for example sheets, tubes, etc., is entirely successful and practical, and such flexible mica products are a genuine novelty. Heretofore, when water-glass has been used as a binder, only hard stiff plates or other products were desired, and heretofore the attempt was made to use said products at temperatures above 80° C.; as a result the plates disintegrated and water-glass came into disrepute as a practical binder for cementing mica plates into a sheet or other product for any purpose whatever.

In addition to the use of individual salts or compounds of the class herein described as binders for flexible mica products, there may be used mixtures of such salts as the binder; for example there may be used equal parts (on a dry basis) of sodium metaphosphate and sodium metaborate as the binder, in which case a solution of one salt may function as a solvent for another salt, and flexible mica products obtained by such a mixture have shown excellent properties; thus a flexible mica sheet with the above double salt binder possessed when dried out a dielectric strength of 846 volts per mil.

I claim:—

1. A flexible integrated mica product, consisting of built-up mica flakes, said mica flakes cemented and bound together by a viscous inorganic binder, said binder consisting of at least one selected from the group of the soluble viscous aqueous colloidal adhesive associations of metaphosphoric acid radicle compounds, metaborates, beryllium compounds, and vanadium compounds, the water in the binder of the mica product being sufficient to maintain said binder as a viscous colloidal adhesive.

2. A flexible integrated mica product, consisting of built-up mica flakes, said mica flakes cemented and bound together by a viscous inorganic binder, said binder consisting of at least one selected from the group of the soluble viscous aqueous colloidal adhesive associations of metaphosphoric acid radicle compounds, metaborates, beryllium compounds, and vanadium compounds, the water in the binder of the mica product being sufficient to maintain said binder as a viscous colloidal adhesive, and having the property of being flexible and high resistant at one temperture, and less flexible or inflexible, but of higher resistance after heating to a higher temperature and then cooling.

3. A flexible integrated mica product, consisting of built-up mica flakes, said mica flakes cemented and bound together by a colloidal association of a viscous binder comprising a metaphosphate compound and water, the water in the binder of the mica product being sufficient to maintain said binder as a viscous colloidal adhesive.

4. A flexible integrated mica product, consisting of built-up mica flakes, said mica flakes cemented and bound together by a colloidal association of a viscous binder comprising alkali metal metaphosphate and water, the water in the binder of the mica product being sufficient to maintain said binder as a viscous colloidal adhesive.

5. A flexible integrated mica product, consisting of built-up mica flakes, said mica flakes cemented and bound together by a colloidal association of a viscous binder comprising sodium metaphosphate and water, the water in the binder of the mica product being sufficient to maintain said binder as a viscous colloidal adhesive.

6. A flexible integrated mica product consisting of built-up mica flakes, said mica flakes cemented and bound together by a colloidal association of a viscous binder comprising metaphosphoric acid and water, the water in the binder of the mica product being sufficient to maintain said binder as a viscous colloidal adhesive.

7. A flexible integrated mica product, consisting of built-up mica flakes, said mica flakes cemented and bound together by a colloidal association of a viscous binder comprising sodium metaborate and water, the water in the binder of the mica product being sufficient to maintain said binder as a viscous colloidal adhesive.

8. The method of making flexible integrated mica products, which consists of cementing together a plurality of mica flakes with an aqueous association of at least one adhesive inorganic binder selected from the group consisting of viscous colloidal aqueous associations of metaphosphoric acid radicle compounds, metaborates, beryllium compounds, and vanadium compounds, rolling or pressing the assembled mass, and retaining sufficient water in the binder of the completed mica product to maintain said binder viscous and the product flexible.

9. The method of making flexible integrated mica products, which consists of cementing together a plurality of mica flakes with an aqueous association of a plurality of mutually dissolved adhesive inorganic binders selected from the group consisting of viscous colloidal aqueous associations of metaphosphoric acid radicle compounds, metaborates, beryllium compounds, and vanadium compounds, rolling or pressing the assembled mass, and retaining sufficient water in the binder of the completed mica product to maintain said binder viscous and the product flexible.

WILLIS A. BOUGHTON.